United States Patent
Harada et al.

(10) Patent No.: US 9,975,970 B2
(45) Date of Patent: May 22, 2018

(54) SPACER PARTICLE FOR RESIN COMPOSITION LAYER AND USE THEREOF

(71) Applicant: Sekisui Plastics Co., Ltd., Osaka-shi (JP)

(72) Inventors: Ryosuke Harada, Koka (JP); Tomoyuki Takahashi, Koka (JP); Fumitaka Ishimori, Koka (JP)

(73) Assignee: Sekisui Plastics Co., Ltd., Osaka-shi (JP)

(*) Notice: Subject to any disclaimer, the term of this patent is extended or adjusted under 35 U.S.C. 154(b) by 476 days.

(21) Appl. No.: 14/345,500

(22) PCT Filed: Sep. 27, 2012

(86) PCT No.: PCT/JP2012/074855
§ 371 (c)(1),
(2) Date: Mar. 18, 2014

(87) PCT Pub. No.: WO2013/047643
PCT Pub. Date: Apr. 4, 2013

(65) Prior Publication Data
US 2014/0377537 A1 Dec. 25, 2014

(30) Foreign Application Priority Data
Sep. 27, 2011 (JP) ................. 2011-210817

(51) Int. Cl.
*C08F 20/12* (2006.01)
*C08F 2/18* (2006.01)
*C08L 33/08* (2006.01)
*G02F 1/1339* (2006.01)

(52) U.S. Cl.
CPC ............ *C08F 20/12* (2013.01); *C08F 2/18* (2013.01); *C08L 33/08* (2013.01); *C08F 2500/24* (2013.01); *G02F 1/1339* (2013.01); *Y10T 428/254* (2015.01); *Y10T 428/2982* (2015.01)

(58) Field of Classification Search
None
See application file for complete search history.

(56) References Cited

U.S. PATENT DOCUMENTS

| | | |
|---|---|---|
| 5,846,657 A | 12/1998 | Wu |
| 6,031,051 A | 2/2000 | Wu |
| 6,352,775 B1 * | 3/2002 | Sasaki ............... B32B 27/06 428/403 |
| 2009/0311827 A1 | 12/2009 | Ishizawa et al. |
| 2010/0076119 A1 | 3/2010 | Ishizawa et al. |
| 2012/0021233 A1 | 1/2012 | Hayakawa et al. |

FOREIGN PATENT DOCUMENTS

| | | |
|---|---|---|
| JP | 03-037201 A | 2/1991 |
| JP | 07-196752 A | 8/1995 |
| JP | 08-278506 A | 10/1996 |
| JP | 09-113916 A | 5/1997 |
| JP | 09-218414 A | 8/1997 |
| JP | 11-189765 A | 7/1999 |
| JP | 2000-034306 A | 2/2000 |
| JP | 2000-098397 A | 4/2000 |
| JP | 2000-186017 A | 7/2000 |
| JP | 2003-179200 A | 6/2003 |
| JP | 2004292624 A * | 10/2004 |
| JP | 2006-066816 A | 3/2006 |
| JP | 2008-116287 A | 5/2008 |
| JP | 4218848 B2 | 2/2009 |
| JP | 2009-155450 A | 7/2009 |
| JP | 2009-158712 A | 7/2009 |
| JP | 2010-215863 A | 9/2010 |
| JP | 2011-163884 A | 8/2011 |
| WO | WO-2008/010555 A1 | 1/2008 |
| WO | WO-2008/084843 A1 | 7/2008 |
| WO | WO-2010/104125 A1 | 9/2010 |

OTHER PUBLICATIONS

Office Action dated Jan. 21, 2015 to the corresponding Chinese patent application No. 201280047445.4 and Japanese translation thereof.
International Search Report dated Jan. 15, 2013, issued for PCT/JP2012/074855.

* cited by examiner

*Primary Examiner* — Elizabeth A Robinson
(74) *Attorney, Agent, or Firm* — Locke Lord LLP

(57) ABSTRACT

Spacer particles for a resin composition layer have a compressive strength at 10% compressive deformation (10% compressive strength) at room temperature (rt) of 0.05 to 10 MPa, have a rate of change in 10% compressive strength-by a temperature change from rt to 50° C. of 5% or less or have a rate of change in 10% compressive strength by a temperature change from −20° C. to rt of 30% or less, and have a volume average particle diameter of 2 to 200 µm and a coefficient of variation in particle diameter of 15% or less.

10 Claims, No Drawings

SPACER PARTICLE FOR RESIN COMPOSITION LAYER AND USE THEREOF

TECHNICAL FIELD

The present invention relates to spacer particles for a resin composition layer to be added into a resin composition layer in order to control the thickness of the resin composition layer (for example, a resin composition layer for bonding members to each other) (in particular, in order to adjust the thickness to an even and desired thickness) and a use of the spacer particles (for a laminated sheet) and more specifically relates to spacer particles for a resin composition layer having a small rate of change in compressive strength with temperature and a use of the spacer particles (for a laminated sheet).

BACKGROUND ART

The demand for downsizing electronic components has accelerated three-dimensional packing by which a plurality of electronic members are stacked to form an electronic member laminated body having a multilayer structure. In addition, further downsizing of electronic components such as an electronic member laminated body has been studied. In such a situation, an electronic member joining layer for joining (bonding) electronic members to each other in an electronic member laminated body, for example, a joining layer for joining a plurality of members to each other constituting a pressure sensor, has become an extremely thin film, and a much finer structure has been formed. Such a three-dimensionally-packed electronic member laminated body is required to include each electronic member with no damage in a (corresponding) joining part and to include electronic members that are stacked parallel to each other.

To address the demands, a method of protecting an underlayer wire in order to obtain a highly reliable electronic member laminated body, a method of interposing a spacer between electronic members in order to stack a plurality of electronic members while maintaining the electronic members parallel to each other, and other methods have been studied. Such a method is exemplified by a method disclosed in Patent Literature 1. In the method, when a plurality of electronic members are stacked, spacers are disposed on a face of an electronic member in a scattered-dot pattern, and then another electronic member is stacked on the face.

However, the spacer disclosed in Patent Literature 1 is formed with a bump that is obtained by applying a paste in a scattered-dot pattern and curing the paste, and thus the spacer is likely to have an uneven diameter. As a result, the clearance between the electronic members is likely to be uneven.

Patent Literature 2 discloses a method of interposing a spacer between electronic members to be joined when a plurality of electronic members are stacked.

However, the spacer disclosed in Patent Literature 2 is a planar member (having a rectangular solid shape or a disk shape) for enlarging the coating area of a synthetic resin and is not a particle spacer for making the clearance between electronic members uniform.

Separately, an adhesive layer including spacer particles has been studied. For example, Patent Literature 3 describes an adhesive that consists essentially of a thermosetting resin composition and rigid plastic fine particles having a particle diameter that substantially defines the film thickness of the adhesive after curing. Patent Literature 3 also describes, in an example, that an adhesive film that contains rigid plastic fine particles having an average particle diameter of 20 μm and has substantially the same film thickness (21 μm or 22 μm) as the average particle diameter of 20 μm of the rigid plastic fine particles can bond a silicon device with a lead frame.

However, as for the composition and the physical properties of the rigid plastic fine particles, Patent Literature 3 merely describes "for example, fine particles of a vinyl polymer obtained by polymerizing a monomer containing divinylbenzene", and the physical properties such as compressive strength of the rigid plastic fine particles are quite unknown. The adhesive thus has a high probability of causing a problem due to an excessively high compressive strength of the rigid plastic fine particles or an excessively high compressive strength of the rigid plastic fine particles.

Rigid plastic fine particles having an excessively high compressive strength may scratch a member in contact with the adhesive film due to the excessively rigid plastic fine particles. The adhesive film containing rigid plastic fine particles having an excessively high compressive strength has poor deformability. This deteriorates the performance of a device including the adhesive film when a member in contact with the adhesive film is required to be deformed (for example, when the member in contact with the adhesive film is a diaphragm of a pressure sensor). Rigid plastic fine particles having an excessively low compressive strength have a smaller anti-compression force in a practical application range. When the adhesive film is pressurized, the rigid plastic fine particles are broken or largely deformed, and the adhesive film fails to maintain an appropriate film thickness. In order to impart an appropriate strength to the adhesive film containing rigid plastic fine particles having an excessively low compressive strength, the adhesive film is required to contain a larger number of the rigid plastic fine particles. This increases the production cost.

Patent Literatures 4, 5, and 7 disclose an adhesive for an electronic component including spacer particles having an average particle diameter of 2 to 200 μm, a CV value of 10% or less, and a K value of 980 to 10,000 N/mm². Patent Literatures 6 and 8 disclose an adhesive for an electronic component including spacer particles having a CV value of 10% or less and preferably having an average particle diameter of 3 to 200 μm and a K value of 980 to 4,900 N/mm². Here, the K value is a numerical value determined in accordance with the formula below.

$$K = (3/\sqrt{2}) \cdot F \cdot S^{-3/2} \cdot R^{-1/2}$$

(In the formula, F is the load value (kgf) at 10% compressive deformation of spacer particles, S is a compressive deformation (mm) at 10% compressive deformation of spacer particles, and R is the radius (mm) of spacer particles)

Patent Literatures 4 to 8 describe no measurement temperature for the K value, but Patent Literature 12, of which applicants are the same as those of Patent Literatures 4 to 8, defines the K value at 20° C. The measurement temperature of the K value in Patent Literatures 4 to 8 is thus supposed to be room temperature.

By using the spacer particles described in Patent Literatures 4 to 8 in an adhesive for an electronic component and joining two or more layers of electronic members with the adhesive for an electronic component, the distance between the electronic members can be maintained with high precision, and a highly reliable electronic member laminated material can be obtained.

CITATION LIST

Patent Literature

PTL 1: Japanese Unexamined Patent Application Publication No. 2003-179200.
PTL 2: Japanese Unexamined Patent Application Publication No. 2006-66816.
PTL 3: Japanese Unexamined Patent Application Publication No. H11-189765.
PTL 4: Japanese Unexamined Patent Application Publication No. 2009-155450.
PTL 5: Japanese Unexamined Patent Application Publication No. 2009-158712.
PTL 6: WO 2008/010555.
PTL 7: Japanese Unexamined Patent Application Publication No. 2010-215863.
PTL 8: WO 2008/084843.
PTL 9: Japanese Patent No. 4218848.
PTL 10: Japanese Unexamined Patent Application Publication No. H7-196752.
PTL 11: Japanese Unexamined Patent Application Publication No. H8-278506.
PTL 12: Japanese Unexamined Patent Application Publication No. H9-113916.
PTL 13: Japanese Unexamined Patent Application Publication No. H9-218414.
PTL 14: Japanese Unexamined Patent Application Publication No. 2000-34306.
PTL 15: Japanese Unexamined Patent Application Publication No. 2000-98397.
PTL 16: Japanese Unexamined Patent Application Publication No. H3-37201.
PTL 17: Japanese Unexamined Patent Application Publication No. 2011-163884.

SUMMARY OF INVENTION

Technical Problem

The spacer particles described in Patent Literatures 4 to 8 unfortunately have an excessively high compressive strength, thus are too rigid, and may scratch a member in contact with the adhesive layer. The spacer particles described in Patent Literatures 4 to 8 have an excessively high compressive strength, and thus the adhesive layer has poor deformability. This deteriorates the performance of a device employing the adhesive layer (for example, the sensitivity of a pressure sensor employing the adhesive layer) when a member in contact with the adhesive layer is required to be deformed (for example, when the member in contact with the adhesive layer is a diaphragm of a pressure sensor).

The inventors of the present application have produced cross-linked methyl methacrylate polymer particles having a K value that is within the numerical range (980 to 4,900 N/mm$^2$) for the K value specified in Patent Literatures 4 to 8, have added the cross-linked methyl methacrylate polymer particles to the adhesive layer of an pressure sensor, and have found that the sensitivity of the pressure sensor is likely to largely vary with temperature and thus the pressure sensor has low measurement accuracy. This is supposed to be because the compressive strength of spacer particles varies with temperature, this changes the variability of the particle diameter of the spacer particles for a resin composition layer with pressure, and thus the amount of change in thickness of the resin composition layer varies with temperature when a constant pressure is applied to the pressure sensor.

In view of the above problems, the present invention has an object to provide spacer particles for a resin composition layer that can prevent a member in contact with a resin composition layer from being scratched, can ensure sufficient deformability of a resin composition layer, and can prevent characteristics of a resin composition layer from varying with temperature (accordingly can prevent characteristics of a device including the resin composition layer from varying with temperature, for example, can prevent the sensitivity of a pressure sensor including the resin composition layer from varying with temperature), when the spacer particles are added to the resin composition layer. Another object of the present invention is to provide a laminated sheet that can prevent a sheet substrate from being scratched and can prevent characteristics of the laminated sheet from varying with temperature.

Known spacers for a liquid crystal layer, which are not the spacer particles for a resin composition layer, for controlling a liquid crystal layer to have a uniform thickness include a spacer having a compressive strength of more than 150 kg/mm$^2$ (Patent Literature 9), cross-linked polymer particles having a 10% compressive deformation stress ranging from 5.0 to 10.0 kg/mm$^2$ (Patent Literature 10), a spacer for a liquid crystal display including particles having a 10% compressive elastic modulus of 600 to 3,000 kg/mm$^2$ (Patent Literature 11), a spacer for a liquid crystal display including cross-linked fine particles having a K value ranging from 350 to 600 kg/mm$^2$ at 20° C. (Patent Literature 12), a spacer for a liquid crystal display including polymer fine particles having a K value ranging from 250 to 700 kgf/mm$^2$ (Patent Literature 13), a spacer for a liquid crystal display device including fine particles having a K value of 250 to 1,000 kg/mm$^2$ (Patent Literature 14), and a spacer for a liquid crystal display device including fine particles having a compressive rupture strength of 0.1 to 1.0 gf (Patent Literature 15).

However, these spacers have an excessively high compressive strength (a compressive strength at 10% compressive deformation of at least 5.0 kg/mm$^2$ or more) and thus may be unsuited for spacer particles for a resin composition layer. A resin composition layer including the spacer having an excessively high compressive strength may scratch a member (for example, a resin film) in contact with the resin composition layer because the spacer is too rigid. A resin composition layer including the spacer having an excessively high compressive strength has poor deformability. This deteriorates the performance of a device employing the resin composition layer (for example, the sensitivity of a pressure sensor employing the resin composition layer) when a member in contact with the resin composition layer is required to be deformed (for example, when the member in contact with the resin composition layer is a diaphragm of a pressure sensor). In addition, in Patent Literatures 9 to 15, no consideration is given to the variation in compressive strength of the spacer with temperature.

Solution to Problem

In order to solve the problems, the spacer particles for a resin composition layer of the present invention are spacer particles for a resin composition layer, the spacer particles being used for being added into a resin composition layer for controlling a thickness of the resin composition layer. The spacer particles have a compressive strength at 10% compressive deformation at room temperature ranging from 0.05 to 10 MPa, a rate of change in compressive strength at 10% compressive deformation by a temperature change from room temperature to 50° C. of 5% or less, a volume average particle diameter ranging from 2 to 200 μm, and a coefficient of variation in particle diameter of 15% or less. In order to solve the problems, the spacer particles for a resin composition layer of the present invention are spacer particles for a resin composition layer, the spacer particles being used for being added into a resin composition layer for controlling a thickness of the resin composition layer. The spacer particles have a compressive strength at 10% compressive deformation at room temperature ranging from 0.05 to 10 MPa, a rate of change in compressive strength at 10% compressive deformation by a temperature change from −20° C. to room temperature of 30% or less, a volume average particle diameter ranging from 2 to 200 μm, and a coefficient of variation in particle diameter of 15% or less.

The spacer particles with either of such structures have a rate of change in compressive strength at 10% compressive deformation by a temperature change from room temperature to 50° C. of 5% or less or a rate of change in compressive strength at 10% compressive deformation by a temperature change from −20° C. to room temperature of 30% or less. Thus, when the spacer particles for a resin composition layer of the present invention are added into a resin composition layer, the spacer particles can prevent characteristics of the resin composition layer from varying with temperature at least in a temperature range from room temperature to 50° C. or at least in a temperature range from −20° C. to room temperature. The spacer particles accordingly can prevent characteristics of a device including the resin composition layer from varying with temperature. For example, the spacer particles can prevent the sensitivity of a pressure sensor including the resin composition layer from varying with temperature, and this can achieve a pressure sensor having good measurement accuracy.

The spacer particles with each structure have a compressive strength at 10% compressive deformation at room temperature of 10 MPa or less, are softer than conventional spacer particles, have sufficient elasticity, and thus can prevent a member (for example, a resin film) in contact with the resin composition layer from being scratched. The spacer particles with the structure have a compressive strength at 10% compressive deformation at room temperature of 10 MPa or less and thus can ensure sufficient deformability of the resin composition layer. This can improve the performance of a device employing the resin composition layer (for example, the sensitivity of a pressure sensor employing the resin composition layer) when a member in contact with the resin composition layer is required to be deformed (for example, when the member in contact with the resin composition layer is a diaphragm of a pressure sensor).

The spacer particles with each structure have a compressive strength at 10% compressive deformation at room temperature of 0.05 MPa or more and thus can be prevented from being broken or largely deformed when the resin composition layer is pressurized. This can control the film thickness of the resin composition layer to an appropriate film thickness. The spacer particles with the structure have a compressive strength at 10% compressive deformation at room temperature of 0.05 MPa or more. This can avoid the increase in the amount of the spacer particles for a resin composition layer required for imparting an appropriate strength to the resin composition layer and accordingly can avoid the increase in production cost.

The spacer particles with each structure have a coefficient of variation in particle diameter of 15% or less, which is a sufficiently small variation in particle diameter, and thus can control the film thickness of the resin composition layer with sufficient precision.

The spacer particles with each structure have a volume average particle diameter ranging from 2 to 200 μm and thus can control the thickness of a resin composition layer in a range of 2 to 200 μm. This can achieve a resin composition layer suited to the resin composition layer for bonding a plurality of members to each other (for example, the resin composition layer for bonding a plurality of members constituting a pressure sensor to each other).

In the present specification, the compressive strength at 10% compressive deformation is determined as follows: The load of spacer particles for a resin composition layer is determined at a compressive deformation of 10%; and the compressive strength $S_{10}$ at 10% compressive deformation is calculated from the load P (N) and the particle diameter d (mm) of the spacer particles for a resin composition layer before the compression in accordance with the formula:

$$S_{10}=2.8 \times P/(\pi \times d^2).$$

For example, the compressive strength at 10% compressive deformation is determined by the measurement method described in Examples. In the present specification, "room temperature" is a temperature of 23 to 25° C. In the present specification, the volume average particle diameter of spacer particles for a resin composition layer is determined by the Coulter counter method, more specifically, by the measurement method described in Examples.

In order to solve the problems, the spacer particles for a resin composition layer of the present invention are spacer particles for a resin composition layer, the spacer particles being used for being added into a resin composition layer for controlling a thickness of the resin composition layer. The spacer particles have a compressive strength at room temperature ranging from 0.01 to 2 N, the compressive strength being determined as a compressive load at 10% compressive deformation in a thickness direction of a resin composition layer, when the spacer particles are added into the resin composition layer so that the resin composition layer contains 48% by mass of the spacer particles, a rate of change in compressive strength by a temperature change from −50° C. to 50° C. of 15% or less, the compressive strength being determined as a compressive load at 10% compressive deformation in a thickness direction of a resin composition layer, when the spacer particles are added into the resin composition layer so that the resin composition layer contains 48% by mass of the spacer particles, a volume average particle diameter ranging from 2 to 200 μm, and a coefficient of variation in particle diameter of 15% or less.

In the structure, the compressive strength of the spacer particles determined as the compressive load when the spacer particles are added into the resin composition layer so that the spacer particles are contained in the resin composition layer substantially depends on the compressive strength of the spacer particles for a resin composition layer and is not substantially affected by the compressive strengths of other components constituting the resin composition layer except the spacer particles for a resin composition layer. On this account, "a rate of change in compressive strength by a temperature change from −50° C. to 50° C. of 15% or less, the compressive strength being determined as a compressive load at 10% compressive deformation in a thickness direction of a resin composition layer, when the spacer particles are added into the resin composition layer so that the resin composition layer contains 48% by mass of the spacer particles" in the structure shows that the spacer particles for a resin composition layer themselves have a small rate of change in compressive strength (compressive load) at 10% compressive deformation by a temperature change from −50° C. to 50° C. Thus, the spacer particles for a resin composition layer of the present invention with the structure can prevent characteristics of a resin composition layer from varying with temperature at least in a temperature range from −50° C. to 50° C. when added into the resin composition layer. The spacer particles accordingly can prevent characteristics of a device including the resin composition layer from varying with temperature. For example, the spacer particles can prevent the sensitivity of a pressure sensor including the resin composition layer from varying with temperature, and this can achieve a pressure sensor having good measurement accuracy.

The spacer particles with the structure have a compressive strength at room temperature of 2 N or less, which is determined as the compressive load at 10% compressive deformation in a thickness direction of a resin composition layer, when the spacer particles are added into the resin composition layer so that the resin composition layer contains 48% by mass of the spacer particles, are softer than conventional spacer particles, have sufficient elasticity, and thus can prevent a member (for example, a resin film) in contact with the resin composition layer from being scratched. The spacer particles with the structure have a compressive strength at room temperature of 2 N or less, which is determined as the compressive load at 10% compressive deformation in a thickness direction of a resin composition layer, when the spacer particles are added into the resin composition layer so that the resin composition layer contains 48% by mass of the spacer particles, and thus can ensure sufficient deformability of a resin composition layer. This can improve the performance of a device employing the resin composition layer (for example, the sensitivity of a pressure sensor employing the resin composition layer) when a member in contact with the resin composition layer is required to be deformed (for example, when the member in contact with the resin composition layer is a diaphragm of a pressure sensor).

The spacer particles with the structure have a compressive strength at room temperature of 0.01 N or more, which is determined as the compressive load at 10% compressive deformation in a thickness direction of a resin composition layer, when the spacer particles are added into the resin composition layer so that the resin composition layer contains 48% by mass of the spacer particles, and thus can be prevented from being broken or largely deformed when the resin composition layer is pressurized. This can control the film thickness of the resin composition layer to an appropriate film thickness. The spacer particles with the structure have a compressive strength at room temperature of 0.01 N or more, which is determined as the compressive load at 10% compressive deformation in a thickness direction of a resin composition layer, when the spacer particles are added into the resin composition layer so that the resin composition layer contains 48% by mass of the spacer particles. This can avoid the increase in the amount of the spacer particles for a resin composition layer required for imparting an appropriate strength to the resin composition layer and accordingly can avoid the increase in production cost.

The spacer particles with the structure have a coefficient of variation in particle diameter of 15% or less, which is a sufficiently small variation in particle diameter. This can control the film thickness of the resin composition layer with sufficient precision.

The spacer particles with the structure have a volume average particle diameter ranging from 2 to 200 μm and thus can control the thickness of a resin composition layer in a range of 2 to 200 μm. This can achieve a resin composition layer suited to the resin composition layer for bonding a plurality of members to each other (for example, the resin composition layer for bonding a plurality of members constituting a pressure sensor to each other).

In the present specification, the compressive strength determined as the compressive load at 10% compressive deformation in a thickness direction of a resin composition layer, when the spacer particles are added into the resin composition layer so that the resin composition layer contains 48% by mass of spacer particles are determined by, for example, the measurement method described in Examples.

In order to solve the problems, the laminated sheet of the present invention is a laminated sheet including a sheet substrate and a resin composition layer on the sheet substrate, and the resin composition layer contains the spacer particles for a resin composition layer of the present invention.

In the laminated sheet with the structure, the spacer particles contained in the resin composition layer are the spacer particles for a resin composition layer of the present invention, and characteristics of the spacer particles are prevented from varying with temperature. This can prevent characteristics of the resin composition layer from varying with temperature. Thus, when the sheet substrate has such a uniform thickness that the sheet substrate can be used as a spacer and has a small variation in compressive strength with temperature, the laminated sheet with the structure has a uniform thickness, and characteristics of the laminated sheet are prevented from varying with temperature. Such a laminated sheet is thus useful as a spacer resistant to temperature variation.

In the laminated sheet with the structure, the spacer particles contained in the resin composition layer are the spacer particles for a resin composition layer of the present invention, and the spacer particles are softer than conventional spacer particles and have sufficient elasticity. The spacer particles can thus prevent the sheet substrate in contact with the resin composition layer from being scratched.

Advantageous Effects of Invention

The present invention can provide spacer particles for a resin composition layer that can prevent a member in contact with a resin composition layer from being scratched, can ensure sufficient deformability of a resin composition layer, and can prevent characteristics of a resin composition layer from varying with temperature when the spacer particles are added into the resin composition layer and can provide a laminated sheet that can prevent a sheet substrate from being scratched and can prevent characteristics of the laminated sheet from varying with temperature.

DESCRIPTION OF EMBODIMENTS

[Spacer Particles for Resin Composition Layer]

The spacer particles for a resin composition layer of the present invention are spacer particles for a resin composition layer, and the spacer particles are added into a resin composition layer for controlling a thickness of the resin composition layer. The spacer particles have a compressive strength at 10% compressive deformation at room temperature ranging from 0.05 to 10 MPa (about 0.005 to about 1 kgf/mm$^2$), a rate of change in compressive strength at 10% compressive deformation by a temperature change from room temperature to 50° C. of 5% or less, a volume average particle diameter ranging from 2 to 200 m, and a coefficient of variation in particle diameter of 15% or less.

The spacer particles for a resin composition layer with the structure more preferably have a compressive strength at 10% compressive deformation at room temperature of 0.07 MPa or more and even more preferably have a compressive strength at 10% compressive deformation at room temperature of 0.1 MPa or more. This enables the control of the film thickness of the resin composition layer to a more appropriate film thickness and can reduce the amount of the spacer particles for a resin composition layer required for imparting an appropriate strength to the resin composition layer, thus reducing the production cost. The spacer particles for a resin composition layer with the structure more preferably have a compressive strength at 10% compressive deformation at room temperature of 6 MPa or less. This can more effectively prevent a member (for example, a resin film) in contact with the resin composition layer from being scratched and can further increase the sufficient deformability of the resin composition layer, thus further improving the performance of a device employing the resin composition layer (for example, the sensitivity of a pressure sensor employing the resin composition layer).

The spacer particles for a resin composition layer with the structure more preferably have a rate of change in compressive strength at 10% compressive deformation by a temperature change from room temperature to 50° C. of 3% or less and even more preferably 1% or less. This can further prevent characteristics of the resin composition layer from varying with temperature.

The spacer particles for a resin composition layer with the structure more preferably have a rate of change in compressive strength at 10% compressive deformation by a temperature change from −20° C. to room temperature of 30% or less. This can prevent characteristics of the resin composition layer from varying with temperature in a temperature range from −20° C. to 50° C.

The spacer particles for a resin composition layer of the present invention are spacer particles for a resin composition layer, and the spacer particles are added into a resin composition layer for controlling a thickness of the resin composition layer. The spacer particles have a compressive strength at 10% compressive deformation at room temperature ranging from 0.05 to 10 MPa, a rate of change in compressive strength at 10% compressive deformation by a temperature change from −20° C. to room temperature of 30% or less, a volume average particle diameter ranging from 2 to 200 μm, and a coefficient of variation in particle diameter of 15% or less.

The spacer particles for a resin composition layer with the structure more preferably have a compressive strength at 10% compressive deformation at room temperature of 0.07 MPa or more and even more preferably have a compressive strength at 10% compressive deformation at room temperature of 0.1 MPa or more. This enables the control of the film thickness of the resin composition layer to a more appropriate film thickness and can reduce the amount of the spacer particles for a resin composition layer required for imparting an appropriate strength to the resin composition layer, thus reducing the production cost. The spacer particles for a resin composition layer with the structure more preferably have a compressive strength at 10% compressive deformation at room temperature of 6 MPa or less. This can more effectively prevent a member (for example, a resin film) in contact with the resin composition layer from being scratched and can further increase the sufficient deformability of the resin composition layer, thus further improving the performance of a device employing the resin composition layer (for example, the sensitivity of a pressure sensor employing the resin composition layer).

The spacer particles for a resin composition layer with the structure more preferably have a rate of change in compressive strength at 10% compressive deformation by a temperature change from −20° C. to room temperature of 20% or less and even more preferably 10% or less. This can further prevent characteristics of the resin composition layer from varying with temperature.

The spacer particles for a resin composition layer of the present invention are spacer particles for a resin composition layer, and the spacer particles are added into a resin composition layer for controlling a thickness of the resin composition layer. The spacer particles have a compressive strength at room temperature ranging from 0.01 to 2 N, which is determined as the compressive load at 10% compressive deformation in a thickness direction of a resin composition layer, when the spacer particles are added into the resin composition layer so that the resin composition layer contains 48% by mass of the spacer particles, have a rate of change in compressive strength by a temperature change from −50° C. to 50° C. of 15% or less, in which the compressive strength is determined as the compressive load at 10% compressive deformation in a thickness direction of a resin composition layer, when the spacer particles are added into the resin composition layer so that the resin composition layer contains 48% by mass of the spacer particles, and have a volume average particle diameter ranging from 2 to 200 μm and a coefficient of variation in particle diameter of 15% or less.

The spacer particles for a resin composition layer with the structure more preferably have a compressive strength at room temperature of 0.1 N or more, which is determined as the compressive load at 10% compressive deformation in a thickness direction of a resin composition layer, when the spacer particles are added into the resin composition layer so that the resin composition layer contains 48% by mass of the spacer particles. This enables the control of the film thickness of the resin composition layer to a more appropriate film thickness and can reduce the amount of the spacer particles for a resin composition layer required for imparting an appropriate strength to the resin composition layer, thus reducing the production cost. The spacer particles for a resin composition layer with the structure more preferably have a compressive strength at room temperature of 1 N or less, which is determined as the compressive load at 10% compressive deformation in a thickness direction of a resin composition layer, when the spacer particles are added into the resin composition layer so that the resin composition layer contains 48% by mass of the spacer particles. This can more effectively prevent a member (for example, a resin film) in contact with the resin composition layer from being scratched and can further increase the sufficient deformability of the resin composition layer, thus further improving the performance of a device employing the resin composition layer (for example, the sensitivity of a pressure sensor employing the resin composition layer).

The spacer particles for a resin composition layer with the structure more preferably have a rate of change in compressive strength by a temperature change from −50° C. to 50° C. of 10% or less, in which the compressive strength is determined as the compressive load at 10% compressive deformation in a thickness direction of a resin composition layer, when the spacer particles are added into the resin composition layer so that the resin composition layer contains 48% by mass of the spacer particles. This can further prevent characteristics of the resin composition layer from varying with temperature.

The spacer particles for a resin composition layer with each structure more preferably have a coefficient of variation in particle diameter of 12% or less. This enables the control of the film thickness of the resin composition layer with higher precision.

The spacer particles for a resin composition layer with each structure more preferably have a volume average particle diameter ranging from 5 to 200 μm. This can achieve a resin composition layer further suited to the resin composition layer for bonding a plurality of members to each other (for example, the resin composition layer for bonding a plurality of members constituting a pressure sensor to each other).

The spacer particles for a resin composition layer of the present invention preferably include a resin and more preferably include a cross-linked resin because the cross-linked resin is excellent in solvent resistance. The spacer particles for a resin composition layer of the present invention even more preferably include a cross-linked acrylic ester resin. This can achieve the spacer particles for a resin composition layer having excellent compatibility with a binder resin that constitutes the resin composition layer together with the spacer particles for a resin composition layer. Thus, when mixed with a base resin to form a resin composition layer, the spacer particles for a resin composition layer can be uniformly dispersed in the base resin, thus affording the resin composition layer having a uniform thickness and physical properties. Moreover, the spacer particles for a resin composition layer having excellent heat resistance and weatherability can be achieved. Thus, the spacer particles can be mixed with a base resin to form a resin composition layer having excellent heat resistance and weatherability. In addition, the spacer particles for a resin composition layer having a smaller rate of change in compressive strength by a temperature change can be achieved.

The spacer particles including a cross-linked acrylic ester resin for a resin composition layer according to an embodiment of the present invention will next be described in detail.

[Spacer Particles Including Cross-Linked Acrylic Ester Resin for Resin Composition Layer]

The spacer particles including a cross-linked acrylic ester resin for a resin composition layer are a polymer obtained by polymerizing a monomer mixture containing an acrylic ester monofunctional monomer and a cross-linkable monomer. Examples of the polymerization method include a suspension polymerization method such as an aqueous suspension polymerization method, an emulsion polymerization method, a seed polymerization method, and a dispersion polymerization method. Among them, the aqueous suspension polymerization method and the seed polymerization method are preferred as the polymerization method.

The acrylic ester monofunctional monomer is an acrylic ester having one polymerizable alkenyl group (vinyl group in a broad sense) per molecule. The acrylic ester monofunctional monomer is preferably an oil-soluble monomer. The acrylic ester monofunctional monomer is preferably an acrylic ester monofunctional monomer having a $C_{1-12}$ substituent that forms an ester bond to acrylic acid. Specific examples of the acrylic ester monofunctional monomer having a $C_{1-12}$ substituent that forms an ester bond to acrylic acid include acrylic esters such as methyl acrylate, ethyl acrylate, n-butyl acrylate, isobutyl acrylate, 2-ethylhexyl acrylate, and lauryl acrylate.

Among the acrylic ester monofunctional monomers, particularly preferred are acrylic esters of a $C_{1-8}$ alcohol (such as methyl acrylate, ethyl acrylate, n-butyl acrylate, isobutyl acrylate, and 2-ethylhexyl acrylate). This can achieve spacer particles for a resin composition layer excellent in solvent resistance and can achieve spacer particles for a resin composition layer having a smaller rate of change in compressive strength by a temperature change.

The amount of the acrylic ester monofunctional monomer is preferably in a range of 50 to 95% by mass and more preferably in a range of 80 to 90% by mass relative to the total amount of the monomer mixture. This can achieve spacer particles for a resin composition layer excellent in solvent resistance and can achieve spacer particles for a resin composition layer having a smaller rate of change in compressive strength by a temperature change. These acrylic ester monofunctional monomers may be used singly or in combination of a plurality of them.

An additional monofunctional monomer copolymerizable with the acrylic ester monofunctional monomer may be added to the monomer mixture in such a range that the performance of spacer particles for a resin composition layer is not reduced. The additional monofunctional monomer is a compound having one polymerizable alkenyl group (vinyl group in a broad sense) per molecule and a compound except the acrylic ester. Examples of the additional monofunctional monomer include styrene, p-methylstyrene, α-methylstyrene, and vinyl acetate. These additional monofunctional monomers may be used singly or in combination of a plurality of them.

The cross-linkable monomer is a compound (polyfunctional compound) having a plurality of polymerizable alkenyl groups (vinyl groups in a broad sense) per molecule. Examples of such a cross-linkable monomer include (meth)acrylic ester polyfunctional monomers such as ethylene glycol di(meth)acrylate, diethylene glycol di(meth)acrylate, triethylene glycol di(meth)acrylate, pentacontahectaethylene glycol di(meth)acrylate, 1,3-butylene glycol di(meth)acrylate, 1,4-butanediol di(meth)acrylate, 1,6-hexanediol di(meth)acrylate, glycerol di(meth)acrylate, allyl (meth)acrylate, trimethylolpropane tri(meth)acrylate, pentaerythritol tetra(meth)acrylate, phthalate diethylene glycol di(meth)acrylate, caprolactone-modified dipentaerythritol hexa(meth)acrylate, caprolactone-modified neopentyl glycol hydroxypivalate di(meth)acrylate, polyfunctional polyester (meth)acrylate, polyfunctional urethane (meth)acrylate, and a cross-linkable monomer represented by General Formula (I):

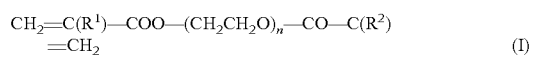

$$CH_2=C(R^1)-COO-(CH_2CH_2O)_n-CO-C(R^2)=CH_2 \quad (I)$$

(where each of $R^1$ and $R^2$ is independently a hydrogen atom or a methyl group, and n is an integer of 5 to 20) having a repeating unit of an oxyethylene group and having a polymerizable alkenyl group at each end of the molecule; and aromatic divinyl monomers such as divinylbenzene, divinylnaphthalene, and derivatives of them. Examples of the cross-linkable monomer represented by General Formula (I) include pentaethylene glycol di(meth)acrylate, hexaethylene glycol di(meth)acrylate, heptaethylene glycol di(meth)acrylate, octaethylene glycol di(meth)acrylate, nonaethylene glycol di(meth)acrylate, decaethylene glycol di(meth)acrylate, tetradecaethylene glycol di(meth)acrylate, and pentadecaethylene glycol di(meth)acrylate. The term "(meth)acrylic" means at least one of acrylic and methacryl, and the term "(meth)acrylate" means at least one of acrylate and methacrylate.

Among these cross-linkable monomers, preferred are (meth)acrylic ester cross-linkable monomers such as ethylene glycol di(meth)acrylate, diethylene glycol di(meth)acrylate, triethylene glycol di(meth)acrylate, 1,3-butylene glycol di(meth)acrylate, 1,4-butanediol di(meth)acrylate, 1,6-hexanediol di(meth)acrylate, nonaethylene glycol di(meth)acrylate, decaethylene glycol di(meth)acrylate, tetradecaethylene glycol di(meth)acrylate, caprolactone-modified dipentaerythritol hexa(meth)acrylate, caprolactone-modified neopentyl glycol hydroxypivalate di(meth)acrylate, and polyfunctional polyester (meth)acrylate because such a monomer has low skin irritation.

The amount of the cross-linkable monomer is preferably in a range of 5 to 50% by mass and more preferably in a range of 10 to 30% by mass relative to the total amount of the monomer mixture. This can achieve spacer particles for a resin composition layer excellent in solvent resistance and can achieve spacer particles for a resin composition layer having a smaller rate of change in compressive strength by a temperature change. These cross-linkable monomers may be used singly or in combination of a plurality of them.

It is particularly preferable that the spacer particles for a resin composition layer of the present invention include a polymer (cross-linked acrylic ester resin) obtained by polymerizing a monomer mixture containing an acrylic ester monofunctional monomer in an amount of 50 to 95% by mass and a cross-linkable monomer in an amount of 5 to 50% by mass and the acrylic ester monofunctional monomer be an acrylic ester of a $C_{1-8}$ alcohol. This can achieve spacer particles for a resin composition layer more excellent in solvent resistance and can achieve spacer particles for a resin composition layer having a much smaller rate of change in compressive strength by a temperature change.

The formulation and amounts of the acrylic ester monofunctional monomer, the additional monofunctional monomer, and the cross-linkable monomer are defined so that the finally obtained spacer particles for a resin composition layer would have a rate of change in compressive strength equal to or less than the upper limit of the numerical range of the present invention and that the spacer particles for a resin composition layer would have a compressive strength within the numerical range of the present invention.

The aqueous suspension polymerization method is a method of suspending the monomer mixture in an aqueous medium and polymerizing the suspended monomer mixture. Examples of the aqueous medium include water and a mixed medium of water and a water-soluble solvent (for example, a lower alcohol (an alcohol with a carbon number of 5 or less)).

In the aqueous suspension polymerization, as necessary, a polymerization initiator, a dispersant, a surfactant, and other additives are used in a reaction system during the polymerization of the monomer mixture.

Examples of the polymerization initiator include oil-soluble peroxides such as benzoyl peroxide, lauroyl peroxide, octanoyl peroxide, orthochlorobenzoyl peroxide, methyl ethyl ketone peroxide, diisopropyl peroxydicarbonate, cumene hydroperoxide, and tert-butyl hydroperoxide; and oil-soluble azo compounds such as 2,2'-azobisisobutyronitrile and 2,2'-azobis(2,4-dimethylvaleronitrile). These polymerization initiators may be used singly or in combination of two or more of them. The amount of the polymerization initiator is preferably in a range of 0.1 to 1 part by mass relative to 100 parts by mass of the monomer mixture.

Examples of the dispersant include poorly water-soluble inorganic salts such as calcium phosphate and magnesium pyrophosphate; and water-soluble polymers such as polyvinyl alcohol, methyl cellulose, and polyvinylpyrrolidone. These dispersants may be used singly or in combination of two or more of them. The amount of the dispersant is preferably in a range of 0.5 to 10 parts by mass relative to 100 parts by mass of the monomer mixture.

Examples of the surfactant include anionic surfactants such as sodium oleate, sodium lauryl sulfate, sodium dodecylbenzenesulfonate, an alkylnaphthalenesulfonate salt, and an alkyl phosphate salt; nonionic surfactants such as polyoxyethylene alkyl ether, polyoxyethylene alkylphenyl ether, polyoxyethylene fatty acid ester, sorbitan fatty acid ester, polyoxysorbitan fatty acid ester, polyoxyethylene alkylamine, and glyceryl fatty acid ester; and amphoteric surfactants such as lauryldimethylamine oxide. These surfactants may be used singly or in combination of two or more of them. The amount of the surfactant is preferably in a range of 0.01 to 0.2 part by mass relative to 100 parts by mass of the aqueous medium.

The polymerization reaction is carried out by mixing an oil phase (for example, a monomer mixture and a polymerization initiator used as needed) and an aqueous phase (for example, an aqueous medium, a dispersant used as needed, and a surfactant used as needed) and then raising the temperature while the mixture is stirred. When the temperature is raised in two stages, the surfactant may be added to the aqueous phase after the temperature rising in the first stage (the first temperature rising) and before the temperature rising in the second stage (second temperature rising).

The polymerization temperature is preferably in a range of 40 to 90° C. The polymerization time is preferably in a range of 1 to 10 hours. During the polymerization, controlling the mixing condition and the stirring condition of the oil phase and the aqueous phase allows spacer particles for a resin composition layer to have a volume average particle diameter within the numerical range of the present invention. The mixing condition and the stirring condition can be controlled by, for example, a dispersion treatment with a homogenizer, a dispersion treatment with an emulsifier/disperser (for example, "T. K. HOMO MIXER MARK II Type 2.5" manufactured by PRIMIX Corporation) using high shearing stress caused in the gap between a rotation blade and a container wall or the gap of rotation blades to each other, a dispersion treatment with an ultrasonic disperser, and a dispersion treatment of passing a monomer through a ceramic microporous membrane by pressure and injecting the monomer into an aqueous medium.

After the completion of polymerization, the dispersant is decomposed by an acid (for example, hydrochloric acid) or the like as needed, and the resulting mixture can be subjected to filtration, washing, drying, pulverization, and classification, thus yielding spacer particles for a resin composition layer. The spacer particles for a resin composition layer may be produced by the method described in Patent Literature 16 (Japanese Unexamined Patent Application Publication No. 3-37201).

The spacer particles for a resin composition layer of the present invention may have a surface to which an inorganic powder adheres. The inorganic powder is used in order to prevent the spacer particles for a resin composition layer from sticking to each other. The inorganic powder is supposed not to substantially affect the compressive strength of the spacer particles for a resin composition layer.

The inorganic powder may be either a hydrophobic inorganic powder or a hydrophilic inorganic powder. Examples of the inorganic powder include silica, alumina, titania, zirconia, ceria, iron oxide, and zinc oxide. Among these inorganic powders, particularly preferred are powders obtained by hydrophobic treatment of the surface of a hydrophilic inorganic powder. Among such powders, hydrophobic colloidal silica obtained by hydrophobic treatment of silica is particularly preferred because the hydrophobic colloidal silica efficiently adheres to the spacer particles for a resin composition layer and exerts good performance.

The inorganic powder may be added in any of a polymerization step, a filtration step, a drying step, a pulverization step, and a classification step during the production process of the spacer particles for a resin composition layer and is preferably added in a drying step or a pulverization step. The inorganic powder is preferably added in a range of 0.1 to 5 parts by mass and more preferably in a range of 0.5 to 4 parts by mass relative to 100 parts by mass of the spacer particles for a resin composition layer. An inorganic powder added in an amount less than the range is likely to cause sticking of the spacer particles for a resin composition layer to each other.

[Use of Spacer Particles for Resin Composition Layer]

The spacer particles for a resin composition layer of the present invention are added into a resin composition layer in order to control the thickness of the resin composition layer. The resin composition layer includes the spacer particles for a resin composition layer of the present invention and a binder resin. The binder resin may be a resin soluble in an organic solvent or water or an emulsion type aqueous resin dispersible in water. Examples of such a binder resin include an epoxy resin, a polyimide resin, an urethane resin, an acrylic resin, a polyester resin, and a silicone resin. The binder resin is preferably an acrylic resin or a silicone resin. In order to form a resin composition layer having a small variation in compressive strength with temperature, it is preferable to select a binder resin having a similar compressive strength to that of the spacer particles of the present invention.

The thickness of the resin composition layer is determined depending on a thickness of the resin composition layer required for an intended purpose of the resin composition layer (in particular, a thickness (gap thickness) of the resin composition layer required for an intended purpose as the spacer), but in order to maximally exert the advantageous effect of the spacer particles of the present invention, the thickness of the resin composition layer is preferably equal to or less than the average particle diameter of the spacer particles to be used and in a range of 2 to 200 μm.

The laminated sheet of the present invention is a laminated sheet including a resin composition layer containing the spacer particles for a resin composition layer and a sheet substrate, and the resin composition layer is formed on the sheet substrate. The shape of the laminated sheet of the present invention is not particularly limited and may be what is called a plate shape having a comparatively large thickness or may be what is called a film shape having a comparatively small thickness.

The sheet substrate can be appropriately selected from resin sheet substrates made of a resin such as polyethylene terephthalate (hereinafter abbreviated as "PET"), polyester, an acrylic resin, polycarbonate, and polyamide, inorganic sheet substrates such as a transparent glass sheet, and metal sheet substrates made of a metal such as aluminum and stainless steel. The sheet substrate is preferably a resin sheet substrate made of at least one of PET and an acrylic resin. The sheet substrate is preferably a substrate having a compressive strength property equal to or higher than that of the spacer particles of the present invention in order to maximally exert the advantageous effect of the resin composition layer containing the spacer particles of the present invention.

The thickness of the sheet substrate is determined depending on a thickness of the laminated sheet required for an intended purpose of the laminated sheet (in particular, a thickness (gap thickness) of the laminated sheet required for an intended purpose as the spacer). In order to maximally exert the advantageous effect of the resin composition layer containing the spacer particles of the present invention, the thickness of the sheet substrate is preferably equal to or less than the average particle diameter of the spacer particles to be used and in a range of 2 to 200 μm.

The laminated sheet can be produced by, for example, applying a resin composition containing the spacer particles for a resin composition layer onto a sheet substrate to form a resin composition layer. The method for applying the resin composition onto a sheet substrate may be a known applying method such as reverse roll coating, gravure coating, die coating, comma coating, and spray coating.

A conventionally known vibration pressure sensor includes a diaphragm having a thinned section deformable by pressure, a piezoelectric vibration piece having a piezoelectric vibration piece main body and a pair of electrodes provided on the piezoelectric vibration piece body, and a resin composition layer interposed between the piezoelectric vibration piece and the diaphragm and bonding the piezoelectric vibration piece with the diaphragm. The diaphragm is pressurized to deform the piezoelectric vibration piece together with the diaphragm, the piezoelectric vibration piece has a resonance frequency varying in response to the deformation degree, and the resonance frequency is determined to detect the amount of pressure applied to the pressure sensor. In the vibration pressure sensor, the resin composition layer contains spacer particles for a resin composition layer for providing a clearance between the thinned section of the diaphragm and the piezoelectric vibration piece (for example, see Patent Literature 17).

The spacer particles for a resin composition layer of the present invention can also be suitably used as the spacer particles for a resin composition layer used in the vibration pressure sensor. In other words, in the vibration pressure sensor above, spacer particles for a resin composition layer having a compressive strength varying with temperature vary the variability of the particle diameter of the spacer particles for a resin composition layer due to pressure, and this changes the amount of deformation of the diaphragm even when an equal pressure is applied to the vibration pressure sensor. As a result, even when an equal pressure is applied to the vibration pressure sensor, outputs of the vibration pressure sensor vary, in other words, the sensitivity of the vibration pressure sensor varies. On this account, spacer particles for a resin composition layer having a compressive strength varying with temperature reduce the measurement accuracy of the vibration pressure sensor. In contrast, the spacer particles for a resin composition layer of the present invention have a rate of change in compressive strength (compressive strength at 10% compressive deformation) by a temperature change from room temperature to 50° C. of 5% or less or a rate of change in compressive strength (compressive load at 10% compressive deformation) by a temperature change from −50° C. to 50° C. of 15% or less. Accordingly, using the spacer particles for a resin composition layer of the present invention in a vibration pressure sensor can suppress the sensitivity variation with temperature change at least in a temperature range from room temperature to 50° C. or at least in a temperature range from −50° C. to 50° C. and can achieve a vibration pressure sensor having good measurement accuracy.

Another known pressure sensor is a capacitance pressure sensor that includes a diaphragm deformable by pressure, a first electrode provided on the diaphragm, and a second electrode provided above the first electrode via a resin composition layer. The resin composition layer bonds the first electrode with the second electrode, the resin composition layer contains a plurality of spacer particles for a resin composition layer in order to maintain a constant distance between the first electrode and the second electrode, the diaphragm is deformed to change the distance between the first electrode and the second electrode, this changes the capacitance between the first electrode and the second electrode, and the capacitance change is converted into an electric signal representing a pressure value, which is output.

The spacer particles for a resin composition layer of the present invention can also be suitably used as the spacer particles for a resin composition layer used in the capacitance pressure sensor. In other words, in the capacitance pressure sensor, spacer particles for a resin composition layer having a compressive strength varying with temperature vary with temperature the variability of the particle diameter of the spacer particles for a resin composition layer due to pressure, and this changes the variation in distance between the first electrode and the second electrode even when an equal pressure is applied to the capacitance pressure sensor. As a result, even when an equal pressure is applied to the capacitance pressure sensor, output electric signals of the capacitance pressure sensorvary, in other words, the sensitivity of the capacitance pressure sensor varies. On this account, spacer particles for a resin composition layer having a compressive strength varying with temperature reduce the measurement accuracy of the capacitance pressure sensor. In contrast, the spacer particles for a resin composition layer of the present invention have a rate of change in compressive strength (compressive strength at 10% compressive deformation) by a temperature change from room temperature to 50° C. of 5% or less or a rate of change in compressive strength (compressive load at 10% compressive deformation) by a temperature change from −50° C. to 50° C. of 15% or less. Accordingly, using the spacer particles for a resin composition layer of the present invention in a capacitance pressure sensor can suppress the sensitivity variation with temperature change at least in a temperature range from room temperature to 50° C. or at least in a temperature range from −50° C. to 50° C. and can achieve a capacitance pressure sensor having good measurement accuracy.

Such various pressure sensors as described above are preferred as a pressure sensor for exhaust gas used to determine the pressure of automobile exhaust gas. This is because the sensitivity of the pressure sensor for exhaust gas is desirably prevented from varying with temperature from the temperature in a cold climate area (for example, about −20° C.) to about 50° C.

The spacer particles for a resin composition layer of the present invention can also be suitably used as the spacer particles for a resin composition layer added to a resin composition layer bonding a plurality of members constituting a sensor (for example, an acceleration sensor detecting the deformation of a diaphragm due to acceleration as an electric signal) except pressure sensors in order to maintain a constant clearance between the members. This can achieve sensors such as an acceleration sensor having good measurement accuracy. The spacer particles for a resin composition layer of the present invention can also be suitably used, as spacer particles for a resin composition layer used in additional applications except sensors, as the spacer particles for a resin composition layer added to a resin composition layer bonding a plurality of members constituting an electronic component (for example, a semiconductor chip and an electronic module) in order to maintain a constant clearance between the members. This can achieve electronic components of which characteristics are prevented from varying with temperature.

EXAMPLES

Examples of the present invention will be described hereinafter, but the present invention is not limited to the examples. First, the measurement methods of volume average particle diameter, coefficient of variation in particle diameter, and compressive strength in the examples and comparative examples will be described.

[Measurement Methods of Volume Average Particle Diameter and Coefficient of Variation in Particle Diameter of Spacer Particles for Resin Composition Layer]

The volume average particle diameter and the CV value of spacer particles for a resin composition layer were determined in accordance with Reference MANUAL FOR THE COULTERMULTISIZER (1987) published by Coulter Electronics Limited as follows: Calibration was carried out with a Coulter precise particle size distribution analyzer (trade name "Coulter Multisizer III", manufactured by Beckman Coulter, Inc.) using an aperture with a size (diameter) of X µm suited for the particle diameter of particles to be determined, and the volume average particle diameter and the CV value were determined with the Coulter precise particle size distribution analyzer.

The aperture size (X µm) is 20 µm for spacer particles for a resin composition layer having an average particle diameter of less than 1 µm, is 50 µm for spacer particles for a resin composition layer having an average particle diameter of 1 µm or more and less than 10 µm, is 100 µm for spacer particles for a resin composition layer having an average particle diameter of 10 µm or more and less than 30 µm, is 280 µm for spacer particles for a resin composition layer having an average particle diameter of 30 µm or more and less than 90 µm, and is 400 µm for spacer particles for a resin composition layer having an average particle diameter of more than 90 µm.

Specifically, 0.1 g of spacer particles for a resin composition layer were preliminarily dispersed in 10 µml of 0.1% by mass aqueous nonionic surfactant solution with a Touch Mixer (trade name "TOUCHMIXER MT-31", manufactured by Yamato Scientific Co., Ltd.) and an ultrasonic disperser, thus yielding a dispersion liquid. Next, the dispersion liquid was added dropwise with a dropper into a beaker filled with an electrolytic solution for measurement ("ISOTON (registered trademark) II", manufactured by Beckman Coulter, Inc.) and attached to a main body of the measurement equipment while the electrolytic solution was gently stirred, thus adjusting the concentration shown on a display of the main body of the measurement equipment to around 10%. Next, an aperture with a size of X µm was set to the main body of the measurement equipment, then the Current (aperture current), the Gain, and the Polarity (polarity of the inside electrode) were adjusted to a predetermined condition corresponding to the aperture size, and the volume average particle diameter and the standard deviation of volumetric particle size distribution were determined. During the measurement, the content in the beaker was gently stirred to such a degree that bubbles were not contained, and the measurement was completed when 100,000 spacer particles for a resin composition layer were measured. The arithmetic mean diameter of volumetric particle size distribution (arithmetic mean diameter in terms of % by volume) was calculated as the volume average particle diameter of the spacer particles for a resin composition layer.

The coefficient of variation (CV value) in the particle diameter of spacer particles for a resin composition layer was calculated from the standard deviation (σ) and the volume average particle diameter (D) in accordance with the formula below.

$$CV\ value(\%) = (\sigma/D) \times 100$$

[Measurement Methods of Compressive Strength and Rate of Change in Compressive Strength of Spacer Particles for Resin Composition Layer]

The compressive strengths at 10% compressive deformation of spacer particles for a resin composition layer in an atmosphere at room temperature (23 to 25° C.) and in an atmosphere at 50° C. were determined by compression test with a micro-compression tester ("MCT-W201") manufactured by Shimadzu Corporation. In other words, first, spacer particles for a resin composition layer were placed on a lower loading plate (SKS flat plate). Next, a downward load was applied in the vertical direction with an upper indenter (diamond flat indenter) having a diameter of 50 μm at a constant loading rate of 1.422 mN/sec with respect to one of the spacer particles for a resin composition layer on the lower loading plate until the load reached a maximum load (test force) of 19.60 mN, thus compressing the spacer particles for a resin composition layer. The used upper indenter had a size suitable for the particle diameter of spacer particles for a resin composition layer. Spacer particles for a resin composition layer of Example 2 and Comparative Example 2 to be measured had a volume average particle diameter of 15.0 μm, and thus the measurement of these spacer particles for a resin composition layer employed an upper indenter having a diameter of 50 μm. The measurement of spacer particles for a resin composition layer of Example 3 having a volume average particle diameter of 30.0 μm employed an upper indenter having a diameter of 50 μm. The measurement of spacer particles for a resin composition layer of Example 1 or Comparative Example 1 having a volume average particle diameter of 100.0 μm or 101.5 μm employed an upper indenter having a diameter of 500 μm.

Then, the load was recorded when the compressive deformation (the ratio of the reduction in diameter by the compression relative to the diameter before the compression) of the spacer particles for a resin composition layer reached 10%, and the compressive strength $S_{10}$ at 10% compressive deformation of the spacer particles for a resin composition layer was calculated from the load P (N) and the particle diameter d (mm) of the spacer particles for a resin composition layer before the compression in accordance with the formula:

$$S_{10} = 2.8 \times P / (\pi \times d^2).$$

The compressive strength at 10% compressive deformation was determined in an atmosphere at room temperature (23 to 25° C.) and in an atmosphere at 50° C. by the measurement method above. For each temperature condition, the compressive strength at 10% compressive deformation was determined five times while the spacer particles for a resin composition layer were replaced for each measurement, and the average of the compressive strengths at 10% compressive deformation obtained by five measurements was regarded as a measured value of the compressive strength at 10% compressive deformation.

The rate of change in compressive strength at 10% compressive deformation by a temperature change from room temperature to 50° C. was calculated from the compressive strength at 10% compressive deformation in an atmosphere at room temperature and the compressive strength at 10% compressive deformation in an atmosphere at 50° C. in accordance with the formula below.

$$\text{Rate of change}(\%) = ((F_{r.t} - F_{50})/F_{r.t}) \times 100$$

(In the formula, $F_{r.t}$ is a compressive strength (MPa) at room temperature, and $F_{50}$ is a compressive strength (MPa) at 50° C.)

The compressive strength at 10% compressive deformation of spacer particles for a resin composition layer at −20° C. was determined by the compression test with a micro hardness tester (trade name "HM2000") manufactured by Fischer Instruments K.K. In other words, first, spacer particles for a resin composition layer were placed on a stage adjusted at −20° C. Next, a downward load was applied in the vertical direction with a 100-μm square flat indenter (diamond flat indenter) under a load increase mode so that the load reached a maximum load of 49.0 mN over 70 seconds with respect to one of the spacer particles for a resin composition layer on the stage, thus compressing the spacer particles for a resin composition layer. Then, the load was recorded when the compressive deformation (the ratio of the reduction in diameter by the compression relative to the diameter before the compression) of the spacer particles for a resin composition layer reached 10%, and the compressive strength $S_{10}$ at 10% compressive deformation of the spacer particles for a resin composition layer was calculated from the load P (N) and the particle diameter d (mm) of the spacer particles for a resin composition layer before the compression in accordance with the formula:

$$S_{10} = 2.8 \times P / (\pi \times d^2).$$

The rate of change in compressive strength at 10% compressive deformation by a temperature change from −20° C. to room temperature was calculated from the compressive strength at 10% compressive deformation in an atmosphere at −20° C. and the compressive strength at 10% compressive deformation in an atmosphere at room temperature in accordance with the formula below.

$$\text{Rate of change}(\%) = ((F_{-20} - F_{r.t})/F_{-20}) \times 100$$

(In the formula, $F_{-20}$ is a compressive strength (MPa) at −20° C., and $F_{r.t}$ is a compressive strength (MPa) at room temperature)

[Measurement Methods of Compressive Strength and Rate of Change in Compressive Strength of Spacer Particles for Resin Composition Layer, Added in Resin Composition Layer]

The compressive strength (hereinafter, appropriately called "compressive strength in a film state") of spacer particles for a resin composition layer determined as the compressive load at 10% compressive deformation in the thickness direction of a resin composition layer, when the spacer particles are added into the resin composition layer so that the spacer particles were added into the resin composition layer was determined as below by using a two-pack type acrylic resin (acrylic urethane resin) including a main agent and a curing agent as a binder resin.

First, in a container for centrifugal dispersion, 5.8 parts by mass of a main agent (trade name "VM-D Medium", manufactured by Dainichiseika Color & Chemicals Mfg. Co., Ltd., a vinyl chloride-vinyl acetate-acrylic acid terpolymer as a polyol compound) of a two-pack type acrylic resin as a binder resin and 4.2 parts by mass of methyl ethyl ketone as a solvent were placed, and the main agent of the acrylic resin was dissolved in the methyl ethyl ketone to yield a solution of the main agent of the acrylic resin. To the solution of the main agent of the acrylic resin, 6.0 parts by mass of spacer particles for a resin composition layer and 0.6 part by mass of a curing agent (trade name "VM-D curing agent", manufactured by Dainichiseika Color & Chemicals Mfg. Co., Ltd., an isocyanate compound) of the two-pack type acrylic resin were added to yield a mixture of the acrylic resin solution and the spacer particles for a resin composition layer. The container for centrifugal dispersion containing the mixture was set in a centrifugal degassing apparatus (trade name "THINKY MIXER (registered trademark)", manufactured by THINKY, a planetary centrifugal mixer), and the mixture was stirred for 3 minutes to yield a particle dispersion liquid in which the spacer particles for a resin composition layer were dispersed in the acrylic resin solution.

Next, a test film containing spacer particles for a resin composition layer to be measured was prepared. In other words, the particle dispersion liquid in which the spacer particles for a resin composition layer were dispersed in the acrylic resin solution was dropped onto a transparent PET film (trade name "OHP film PP2500", manufactured by Sumitomo 3M, external dimension: a width of 210 mm, a length of 297 mm, and a thickness of 100 μm), and the particle dispersion liquid was applied onto the transparent PET film by bar coating, thereby forming a wet film (a film of the particle dispersion liquid) having a thickness (wet film thickness) of 100 μm on the transparent PET film. Then, the wet film was cured to yield a test film (5 cm×5 cm) including two layers of the cured particle dispersion liquid layer (resin composition layer) and the transparent PET film.

Here, the resin composition layer contains (6.0 parts by mass of) the spacer particles for a resin composition layer in an amount of 48% by mass relative to the total mass (12.4 parts by mass) of the resin composition layer. In the resin composition layer, the thickness (dry film thickness) of an area containing no spacer particles for a resin composition layer was less than that of the wet film thickness (100 μm), thus was less than the volume average particle diameter (100 μm) of the spacer particles for a resin composition layer, and was less than 90 μm (less than the thickness (maximum thickness) of the resin composition layer at a compressive deformation of 10%).

Next, the compressive strength of the test film was determined with a tension and compression testing machine (computer-controlled precision universal tester, trade name "Autograph AG-X", model "AG-100kNX") manufactured by Shimadzu Corporation. A load was applied to the test film placed on a sample table in the thickness direction with a circular platen having a diameter of 10 cm at a constant loading rate of 1.422 mN/sec, thus compressing the test film. Then, the load (compressive load) was recorded when the compressive deformation (the ratio of the reduction in thickness by the compression relative to the thickness before the compression) of the test film reached 10%, and the recorded load was regarded as the compressive strength of the test film, that is, the compressive strength of the spacer particles for a resin composition layer in a film state. Here, the platen and the sample table were made of an SK material (carbon tool steel).

The compressive strength in a film state of the test film containing spacer particles for a resin composition layer was determined by the measurement method above in an atmosphere at −50° C., in an atmosphere at room temperature (23 to 25° C.), and in an atmosphere at 50° C. For each temperature condition, the compressive strength in a film state was determined three times while the test film was replaced for each measurement, and the average of the compressive strengths in a film state obtained by three measurements was regarded as a measured value of the compressive strength in a film state.

The compressive strength (N) determined as the compressive load can be converted into a compressive strength (MPa) in accordance with the formula below if the compressive load is evenly applied to a test film facing the platen.

$$S = p/d^2 = p/2500$$

(In the formula, S is a compressive strength (MPa), p is a compressive strength (N) determined as the compressive load, and d is a side length (mm) of a square test film)

The rate of change in compressive strength in a film state by a temperature change from −50° C. to 50° C. was calculated from the compressive strength in a film state in an atmosphere at −50° C. and the compressive strength in a film state in an atmosphere at 50° C. in accordance with the formula below.

$$\text{Rate of change}(\%) = ((F_{-50} - F_{50})/F_{-50}) \times 100$$

(In the formula, $F_{-50}$ is a compressive strength (N) in a film state in an atmosphere at −50° C., and $F_{50}$ is a compressive strength (N) in a film state in an atmosphere at 50° C.)

Example 1

First, 73 parts by mass of n-butyl acrylate, 8 parts by mass of methyl acrylate, and 6 parts by mass of 2-ethylhexyl acrylate as acrylic ester monofunctional monomers, 13 parts by mass of ethylene glycol dimethacrylate (manufactured by Kyoeisha Chemical Co., Ltd.) as an cross-linkable monomer, and 0.2 part by mass of 2,2'-azobisisobutyronitrile and 0.1 part by mass of benzoyl peroxide as polymerization initiators were mixed to yield an oil phase. Separately, 200 parts by mass of deionized water as an aqueous medium and 6.1 parts by mass of magnesium pyrophosphate generated by a double decomposition method as a dispersant were mixed to yield an aqueous phase.

Next, the oil phase was dispersed in the aqueous phase to yield a dispersion liquid. The dispersion liquid was placed in a polymerization vessel equipped with a stirrer and a thermometer and was stirred in an atmosphere at 30° C. with the stirrer at a rotation speed of 250 rpm for about 10 minutes, thereby yielding a suspension. Then, the temperature in the polymerization vessel was raised to 50° C., and the stirring of the suspension was continued for 3 hours. To the suspension, 0.05 part by mass of sodium dodecylbenzenesulfonate as a surfactant was added, and then the temperature in the polymerization vessel was raised to 90° C. (second temperature rising). The suspension was stirred at 90° C. for 1.5 hours to complete the suspension polymerization.

The suspension was cooled, and the dispersant (magnesium pyrophosphate) contained in the suspension was decomposed by hydrochloric acid. Then, the suspension was dehydrated by filtration to separate the solid content, and the solid content was washed with sufficient water. To the solid content after washing, 2.5 parts by mass of hydrophobic colloidal silica (manufactured by Nippon Aerosil Co., Ltd., trade name "AEROSIL (registered trademark) R974") was added as an inorganic powder, and the mixture was dried under reduced pressure to yield resin particles. Finally, the resin particles were classified to adjust the particle size of the resin particles, thereby affording resin particles as spacer particles for a resin composition layer. In the classification of the resin particles, small particles having a particle diameter smaller than a desired particle diameter range were removed by air classification, and large particles having a particle diameter larger than a desired particle diameter range were removed by classification with a sieve. This yielded spacer particles for a resin composition layer having a coefficient of variation (CV value) in particle diameter of 10.7% and a volume average particle diameter of 100.0 μm.

Example 2

First, an oil phase and an aqueous phase were prepared in the same manner as in Example 1.

Next, the oil phase and the aqueous phase were stirred with a homo-mixer (desktop high-speed emulsifier/disperser manufactured by PRIMIX Corporation, trade name "T. K. HOMO MIXER MARK II Type 2.5") at a rotation speed of 4,000 rpm for 10 minutes, and thus the oil phase was dispersed in the aqueous phase to yield a suspension. The suspension was then placed in a polymerization vessel equipped with a stirrer and a thermometer and was stirred at 50° C. for 3 hours to undergo the suspension polymerization. To the suspension, 0.05 part by mass of sodium dodecylbenzenesulfonate as a surfactant was added, and then the temperature in the polymerization vessel was raised to 90° C. (second temperature rising). The suspension was stirred at 90° C. for 1.5 hours to complete the suspension polymerization.

The suspension was cooled, and the dispersant (magnesium pyrophosphate) contained in the suspension was decomposed by hydrochloric acid. Then, the suspension was dehydrated by filtration to separate the solid content, and the solid content was washed with sufficient water. To the solid content after washing, 2.5 parts by mass of hydrophobic colloidal silica (manufactured by Nippon Aerosil Co., Ltd., trade name "AEROSIL (registered trademark) R974") was added as an inorganic powder, and the mixture was dried under reduced pressure to yield resin particles. Finally, the resin particles were classified to adjust the particle size of the resin particles, thereby affording resin particles as spacer particles for a resin composition layer. In the classification of the resin particles, small particles having a particle diameter smaller than a desired particle diameter range were removed by air classification, and large particles having a particle diameter larger than a desired particle diameter range were removed by classification with a sieve. This yielded spacer particles for a resin composition layer having a coefficient of variation (CV value) in particle diameter of 13.0% and a volume average particle diameter of 15.0 μm.

Example 3

First, 67 parts by mass of n-butyl acrylate, 7 parts by mass of methyl acrylate, and 5 parts by mass of 2-ethylhexyl acrylate as acrylic ester monofunctional monomers, 1 part by mass of ethylene glycol dimethacrylate (manufactured by Kyoeisha Chemical Co., Ltd.) and 20 parts by mass of tetradecaethylene glycol dimethacrylate (manufactured by Kyoeisha Chemical Co., Ltd., trade name "Light Ester 14EG") as cross-linkable monomers, and 0.2 part by mass of 2,2'-azobisisobutyronitrile and 0.1 part by mass of benzoyl peroxide as polymerization initiators were mixed to yield an oil phase. Separately, 200 parts by mass of deionized water as an aqueous medium and 6.1 parts by mass of magnesium pyrophosphate generated by a double decomposition method as a dispersant were mixed to yield an aqueous phase.

Next, the oil phase and the aqueous phase were stirred with a homo-mixer (desktop high-speed emulsifier/disperser manufactured by PRIMIX Corporation, trade name "T. K. HOMO MIXER MARK H Type 2.5") at a rotation speed of 2,000 rpm for 10 minutes, and thus the oil phase was dispersed in the aqueous phase to yield a suspension. The suspension was then placed in a polymerization vessel equipped with a stirrer and a thermometer and was stirred at 50° C. for 3 hours to undergo the suspension polymerization. To the suspension, 0.05 part by mass of sodium dodecylbenzenesulfonate as a surfactant was added, and then the temperature in the polymerization vessel was raised to 90° C. (second temperature rising). The suspension was stirred at 90° C. for 1.5 hours to complete the suspension polymerization.

The suspension was cooled, and the dispersant (magnesium pyrophosphate) contained in the suspension was decomposed by hydrochloric acid. Then, the suspension was dehydrated by filtration to separate the solid content, and the solid content was washed with sufficient water. To the solid content after washing, 2.5 parts by mass of hydrophobic colloidal silica (manufactured by Nippon Aerosil Co., Ltd., trade name "AEROSIL (registered trademark) R974") was added as an inorganic powder, and the mixture was dried under reduced pressure to yield resin particles. Finally, the resin particles were classified to adjust the particle size of the resin particles, thereby affording resin particles as spacer particles for a resin composition layer. In the classification of the resin particles, small particles having a particle diameter smaller than a desired particle diameter range were removed by air classification, and large particles having a particle diameter larger than a desired particle diameter range were removed by classification with a sieve. This yielded spacer particles for a resin composition layer having a coefficient of variation (CV value) in particle diameter of 12.0% and a volume average particle diameter of 30.0 μm.

Comparative Example 1

First, 95 parts by mass of methyl methacrylate as an acrylic ester monofunctional monomer, 5 parts by mass of ethylene glycol dimethacrylate (manufactured by Kyoeisha Chemical Co., Ltd.) as a cross-linkable monomer, and 0.2 part by mass of 2,2'-azobisisobutyronitrile and 0.2 part by mass of benzoyl peroxide as polymerization initiators were mixed to yield an oil phase. Separately, 150 parts by mass of deionized water as an aqueous medium and 2.0 parts by mass of magnesium pyrophosphate generated by a double decomposition method as a dispersant were mixed to yield an aqueous phase.

Next, the oil phase was dispersed in the aqueous phase to yield a dispersion liquid. The dispersion liquid was then placed in a polymerization vessel equipped with a stirrer and a thermometer and was stirred with the stirrer at a rotation speed of 250 rpm for about 10 minutes in an atmosphere at 30° C., thereby yielding a suspension. Then, the temperature in the polymerization vessel was raised to 50° C., and the stirring of the suspension was continued for 3 hours. The temperature in the polymerization vessel was raised to 105° C., and the suspension was further stirred at 105° C. for 1.0 hour to complete the suspension polymerization.

The suspension was cooled, and the dispersant (magnesium pyrophosphate) contained in the suspension was decomposed by hydrochloric acid. Then, the suspension was dehydrated by filtration to separate the solid content, and the solid content was washed with sufficient water. The solid content after washing was dried under reduced pressure to yield resin particles. Finally, the resin particles were classified to adjust the particle size of the resin particles, thereby affording resin particles as spacer particles for a resin composition layer. In the classification of the resin particles, small particles having a particle diameter smaller than a desired particle diameter range were removed by air classification, and large particles having a particle diameter larger than a desired particle diameter range were removed by classification with a sieve. This yielded spacer particles for a resin composition layer having a coefficient of variation (CV value) in particle diameter of 10.8% and a volume average particle diameter of 101.5 μm.

Comparative Example 2

First, 95 parts by mass of methyl methacrylate as an acrylic ester monofunctional monomer, 5 parts by mass of ethylene glycol dimethacrylate (manufactured by Kyoeisha Chemical Co., Ltd.) as a cross-linkable monomer, and 0.2 part by mass of 2,2'-azobisisobutyronitrile and 0.25 part by mass of benzoyl peroxide as polymerization initiators were mixed to yield an oil phase. Separately, 150 parts by mass of deionized water as an aqueous medium, 3.0 parts by mass of magnesium pyrophosphate generated by a double decomposition method as a dispersant, 0.059 part by mass of sodium alkyl sulfate as a surfactant, and 0.015 part by mass of sodium nitrite as a polymerization inhibitor were mixed to yield an aqueous phase.

Next, the oil phase and the aqueous phase were stirred with a homo-mixer (desktop high-speed emulsifier/disperser manufactured by PRIMIX Corporation, trade name "T. K. HOMO MIXER MARK II Type 2.5") at a rotation speed of 4,000 rpm for 10 minutes, and thus the oil phase was dispersed in the aqueous phase to yield a suspension. The suspension was then placed in a polymerization vessel equipped with a stirrer and a thermometer and was stirred at 50° C. for 3 hours to undergo the suspension polymerization. Then, 0.05 part by mass of sodium dodecylbenzenesulfonate as a surfactant and 0.15 part by mass of sulfamic acid as a water-soluble acidic substance to partially decompose or neutralize a suspension stabilizer were added to the suspension. The temperature in the polymerization vessel was raised to 90° C. (second temperature rising), and then the suspension was stirred at 105° C. for 1.5 hours to complete the suspension polymerization.

The suspension was cooled, and the dispersant (magnesium pyrophosphate) contained in the suspension was decomposed by hydrochloric acid. Then, the suspension was dehydrated by filtration to separate the solid content, and the solid content was washed with sufficient water. The solid content after washing was dried under reduced pressure to yield resin particles. Finally, the resin particles were classified to adjust the particle size of the resin particles, thereby affording resin particles as spacer particles for a resin composition layer. In the classification of the resin particles, small particles having a particle diameter smaller than a desired particle diameter range were removed by air classification, and large particles having a particle diameter larger than a desired particle diameter range were removed by classification with a sieve. This yielded spacer particles for a resin composition layer having a coefficient of variation (CV value) in particle diameter of 10.8% and a volume average particle diameter of 15.0 μm.

[Measurement of Compressive Strength at 10% Compressive Deformation of Spacer Particles for Resin Composition Layer]

The compressive strengths at 10% compressive deformation in an atmosphere at room temperature (23 to 25° C.) and in an atmosphere at 50° C. and the rate of change in compressive strength of each of the spacer particles for a resin composition layer, which had a volume average particle diameter of 15.0 μm, of Example 2 and Comparative Example 2 were determined by the measurement method above.

As a result of the measurement, the spacer particles for a resin composition layer of Example 2 had a compressive strength at 10% compressive deformation in an atmosphere at room temperature of 2.06 MPa and a rate of change in compressive strength at 10% compressive deformation by a temperature change from room temperature to 50° C. of 0.48%. The spacer particles for a resin composition layer of Comparative Example 2 had a compressive strength at 10% compressive deformation in an atmosphere at room temperature of 27.95 MPa and a rate of change in compressive strength at 10% compressive deformation by a temperature change from room temperature to 50° C. of 15.21%.

The result revealed that the spacer particles for a resin composition layer of Example 2 had a compressive strength at 10% compressive deformation at room temperature ranging from 0.05 to 10 MPa, which was lower than that of the spacer particles for a resin composition layer of Comparative Example 2, and had a rate of change in compressive strength at 10% compressive deformation by a temperature change of 5% or less, which was greatly suppressed in comparison with the spacer particles for a resin composition layer of Comparative Example 2. It is therefore supposed that when added into a resin composition layer, the spacer particles for a resin composition layer of Example 2 can prevent characteristics of the resin composition layer from varying with temperature.

Table 1 summarizes the compressive strengths at 10% compressive deformation in an atmosphere at room temperature (compressive strengths at room temperature), the compressive strengths at 10% compressive deformation in an atmosphere at 50° C. (compressive strengths at 50° C.), the amounts of change in compressive strength at 10% compressive deformation by a temperature change from room temperature to 50° C. (amounts of change in compressive strength), and the rates of change in compressive strength at 10% compressive deformation by a temperature change from room temperature to 50° C. (rates of change in compressive strength) of the spacer particles for a resin composition layer of Example 2 and Comparative Example 2.

TABLE 1

|  | Compressive strength at room temperature (MPa) | Compressive strength at 50° C. (MPa) | Amount of change in compressive strength (MPa) | Rate of change in compressive strength (%) |
| --- | --- | --- | --- | --- |
| Example 2 | 2.06 | 2.05 | 0.01 | 0.48 |
| Comparative Example 2 | 27.95 | 23.70 | 4.25 | 15.21 |

[Measurement of Compressive Strength at 10% Compressive Deformation of Spacer Particles for Resin Composition Layer at −20° C.]

The compressive strength at room temperature of the spacer particles for a resin composition layer of Example 1 was determined by the compressive strength measurement method described above and was 0.108 MPa. The compressive strength at room temperature of the spacer particles for a resin composition layer of Example 3 was determined by the compressive strength measurement method described above and was 0.103 MPa. The compressive strength at room temperature of the spacer particles for a resin composition layer of Comparative Example 1 was determined by the compressive strength measurement method described above and was 27.35 MPa. The compressive strength at 10% compressive deformation in an atmosphere at −20° C. of each of the spacer particles for a resin composition layer of Examples 1 and 3 and Comparative Example 1 was determined by the measurement method above, and the rate of change in compressive strength by a temperature change from −20° C. to room temperature was calculated.

As a result of the measurement, the spacer particles for a resin composition layer of Example 1 had a compressive strength at 10% compressive deformation in an atmosphere at −20° C. of 0.147 MPa and a rate of change in compressive strength at 10% compressive deformation by a temperature change from −20° C. to room temperature of 26.5%. The spacer particles for a resin composition layer of Example 3 had a compressive strength at 10% compressive deformation in an atmosphere at −20° C. of 0.113 MPa and a rate of change in compressive strength at 10% compressive deformation by a temperature change from −20° C. to room temperature of 8.8%. The spacer particles for a resin composition layer of Comparative Example 1 had a compressive strength at 10% compressive deformation in an atmosphere of −20° C. of 46.23 MPa and a rate of change in compressive strength at 10% compressive deformation by a temperature change from −20° C. to room temperature of 40.8%.

The result revealed that the spacer particles for a resin composition layer of Examples 1 and 3 had a compressive strength at 10% compressive deformation at room temperature ranging from 0.05 to 10 MPa, which was lower than that of the spacer particles for a resin composition layer of Comparative Example 1, and had a rate of change in compressive strength at 10% compressive deformation by a temperature change of 30% or less, which was greatly suppressed in comparison with the spacer particles for a resin composition layer of Comparative Example 1. It is therefore supposed that when added into a resin composition layer, the spacer particles for a resin composition layer of Examples 1 and 3 can prevent characteristics of the resin composition layer from varying with temperature.

Table 2 summarizes the compressive strengths at 10% compressive deformation in an atmosphere at −20° C. (compressive strengths at −20° C.), the compressive strengths at 10% compressive deformation in an atmosphere at room temperature (compressive strengths at room temperature), the amounts of change in compressive strength at 10% compressive deformation by a temperature change from −20° C. to room temperature (amounts of change in compressive strength from −20° C. to room temperature), and the rates of change in compressive strength at 10% compressive deformation by a temperature change from −20° C. to room temperature (rates of change in compressive strength from −20° C.; to room temperature) of the spacer particles for a resin composition layer of Examples 1 and 3 and Comparative Example 1.

The compressive strength at 10% compressive deformation in an atmosphere at 50° C. of each of the spacer particles for a resin composition layer of Example 1 and Comparative Example 1 was determined by the measurement method above, and the rate of change in compressive strength by a temperature change from room temperature to 50° C. was calculated.

As a result of the measurement, the spacer particles for a resin composition layer of Example 1 had a compressive strength at 10% compressive deformation in an atmosphere at 50° C. of 0.103 MPa and a rate of change in compressive strength at 10% compressive deformation by a temperature change from room temperature to 50° C. of 4.6%. The spacer particles for a resin composition layer of Comparative Example 1 had a compressive strength at 10% compressive deformation in an atmosphere at 50° C. of 20.20 MPa and a rate of change in compressive strength at 10% compressive deformation by a temperature change from room temperature to 50° C. of 26.1%.

The result revealed that the spacer particles for a resin composition layer of Example 1 had a rate of change in compressive strength at 10% compressive deformation by a temperature change from room temperature to 50° C. of 5% or less, which was greatly suppressed in comparison with the spacer particles for a resin composition layer of Comparative Example 1. It is therefore supposed that when added into a resin composition layer, the spacer particles for a resin composition layer of Example 1 can prevent characteristics of the resin composition layer from varying with temperature.

Table 2 summarizes the compressive strengths at 10% compressive deformation in an atmosphere at 50° C. (compressive strengths at 50° C.) and the rates of change in compressive strength at 10% compressive deformation by a temperature change from room temperature to 50° C. (rates of change in compressive strength from room temperature to 50° C.) of the spacer particles for a resin composition layer of Example 1 and Comparative Example 1.

TABLE 2

| | Compressive strength at −20° C. (MPa) | Compressive strength at room temperature (MPa) | Compressive strength at 50° C. (MPa) | Amount of change in compressive strength from −20° C. to room temperature (MPa) | Rate of change in compressive strength from −20° C. to room temperature (%) | Rate of change in compressive strength from room temperature to 50° C. (%) |
|---|---|---|---|---|---|---|
| Example 1 | 0.147 | 0.108 | 0.103 | 0.039 | 26.5 | 4.6 |
| Example 3 | 0.113 | 0.103 | — | 0.010 | 8.8 | — |
| Comparative Example 1 | 46.23 | 27.35 | 20.20 | 18.88 | 40.8 | 26.1 |

[Measurement of K Value of Spacer Particles for Resin Composition Layer]

The spacer particles for a resin composition layer of Examples 1 and 2 and the spacer particles for a resin composition layer of Comparative Example 1 and 2 were subjected to a compression test in an atmosphere at room temperature in a similar manner to the above measurement method of compressive strength, and the load value F (kgf) at 10% compressive deformation of the spacer particles for a resin composition layer, the compressive deformation S (mm) at 10% compressive deformation of the spacer particles for a resin composition layer, and the radius R (mm) of the spacer particles for a resin composition layer were determined. From F, S, and R, the K value defined in Patent Literatures 4 to 8 was calculated in accordance with the formula:

$$K=(3/\sqrt{2}) \cdot F \cdot S^{-3/2} \cdot R^{-1/2}.$$

As a result, the spacer particles for a resin composition layer of Example 1 had a K value of 11.44 MPa (N/mm$^2$), the spacer particles for a resin composition layer of Example 2 had a K value of 186.6 MPa (N/mm$^2$), the spacer particles for a resin composition layer of Comparative Example 1 had a K value of 2,939 MPa (N/mm$^2$), and the spacer particles for a resin composition layer of Comparative Example 2 had a K value of 2,960 MPa (N/mm$^2$). The result revealed that the spacer particles for a resin composition layer of Example 1 and Example 2 had a markedly lower K value than the K values of the spacer particles for a resin composition layer of Comparative Example 1 and Comparative Example 2 and than the numerical range (980 to 4,900 N/mm$^2$) of K value defined in Patent Literatures 4 to 8. This is because the spacer particles for a resin composition layer of Example 1 and Example 2 have a markedly lower compressive strength than those of the spacer particles for a resin composition layer of Comparative Example 1 and Comparative Example 2 and the spacer particles for a resin composition layer of Patent Literatures 4 to 8.

[Measurement of Compressive Strength and Rate of Change in Compressive Strength of Spacer Particles for Resin Composition Layer in Film State]

The compressive strength in a film state and the rate of change in compressive strength of each of the spacer particles for a resin composition layer of Example 1 and Comparative Example 1 were determined by the measurement method above in an atmosphere at −50° C., in an atmosphere at room temperature (23 to 25° C.), and in an atmosphere at 50° C.

As a test film for blank test, the test film containing no spacer particles for a resin composition layer and containing an acrylic resin alone was produced. In other words, an acrylic resin solution was prepared in a similar manner to the preparation method of a particle dispersion liquid in the measurement method of the compressive strength of spacer particles for a resin composition layer in a film state described above except that no spacer particles for a resin composition layer were used. Next, a test film for blank test was produced in a similar manner to the measurement method of the compressive strength of spacer particles for a resin composition layer in a film state described above except that the acrylic resin solution was used in place of the particle dispersion liquid containing spacer particles for a resin composition layer. The load at 10% compressive deformation in the thickness direction of the test film for blank test was determined as the compressive strength, and the rate of change in compressive strength by a temperature change from −50° C. to 50° C. was calculated.

As a result of the measurement, the spacer particles for a resin composition layer of Example 1 had a compressive strength in a film state in an atmosphere at room temperature of 0.367 N (1.47×10$^{-4}$ MPa) and a rate of change in compressive strength in a film state by a temperature change from −50° C. to 50° C. of 7.5%. The spacer particles for a resin composition layer of Comparative Example 1 had a compressive strength in a film state in an atmosphere at room temperature of 1.334 N (5.34×10$^{-4}$ MPa) and a rate of change in compressive strength in a film state by a temperature change from −50° C. to 50° C. of 37.8%. The result revealed that the spacer particles for a resin composition layer of Example 1 had a compressive strength in a film state at room temperature ranging from 0.01 to 2 N (4.0×10$^{-6}$ to 8.0×10$^{-4}$ MPa), which was lower than that of the spacer particles for a resin composition layer of Comparative Example 1, and had a rate of change in compressive strength in a film state by a temperature change of 15% or less, which was greatly suppressed in comparison with the spacer particles for a resin composition layer of Comparative Example 1.

The test film for blank test had a markedly higher rate of change in compressive strength in a film state by a temperature change than the rate of change in compressive strength in a film state by a temperature change of the spacer particles for a resin composition layer of Example 1. This revealed that the compressive strength of the spacer particles for a resin composition layer in a film state substantially depends on the compressive strength of the spacer particles for a resin composition layer and is not substantially affected by the compressive strength of an additional component (acrylic resin) except the spacer particles for a resin composition layer constituting the resin composition layer. The spacer particles for a resin composition layer had a much lower compressive strength than the compressive strength of the transparent PET film. This suggests that the compressive strength of the spacer particles for a resin composition layer in a film state is not affected by the compressive strength of the transparent PET film.

Each of the spacer particles for a resin composition layer of Comparative Example 1 and the spacer particles for a resin composition layer of Example 1 were added to the resin composition layer of a pressure sensor to yield a pressure sensor, and the variation in sensitivity with temperature was determined. As a result, the pressure sensor employing the spacer particles for a resin composition layer of Comparative Example 1 showed characteristics of sensitivity that greatly varied with temperature, but the pressure sensor employing the spacer particles for a resin composition layer of Example 1 showed characteristics of sensitivity with a small variation with temperature.

Table 3 summarizes the compressive strengths in a film state in an atmosphere at −50° C. (compressive strengths at −50° C.), the compressive strengths in a film state in an atmosphere at room temperature (compressive strengths at room temperature), the compressive strengths in a film state in an atmosphere at 50° C. (compressive strengths at 50° C.), the amounts of change in compressive strength in a film state by a temperature change from −50° C. to 50° C. (amounts of change in compressive strength), and the rates of change in compressive strength in a film state by a temperature change from −50° C. to 50° C. (rates of change in compressive strength) of the spacer particles for a resin composition layer of Example 1 and Comparative Example 1 and the test film for blank test (blank).

TABLE 3

|  | Compressive strength at −50° C. | Compressive strength at room temperature | Compressive strength at 50° C. | Amount of change in compressive strength | Rate of change in compressive strength |
| --- | --- | --- | --- | --- | --- |
| Example 1 | 0.375N | 0.367N | 0.347N | 0.028N | 7.5% |
| Comparative Example 1 | 1.604N | 1.334N | 0.997N | 0.607N | 37.8% |
| Blank | 2.142N | 1.814N | 1.520N | 0.622N | 29.0% |

The present invention can be carried out in other various forms without departing from the spirit or the main features thereof. Thus, the examples above are merely illustrative in all respects, and should not be considered as limitation. The scope of the invention is described in the claims and is not restricted by the text of the description. All modifications and changes within a range equal to claims are included in the scope of the invention.

The present application claims priority based on Japanese Patent Application No. 2011-210817 filed on Sep. 27, 2011, in Japan. The disclosure is incorporated into the application by reference in its entirety.

The invention claimed is:

1. Spacer particles for a resin composition layer, the spacer particles being used for being added into the resin composition layer for controlling a thickness of the resin composition layer,
  the spacer particles having a compressive strength at 10% compressive deformation at room temperature ranging from 0.05 to 2.06 MPa,
  the spacer particles having a rate of change in compressive strength at 10% compressive deformation by a temperature change from room temperature to 50° C. of 5% or less,
  the spacer particles having a volume average particle diameter ranging from 2 to 200 μm,
  the spacer particles having a coefficient of variation in particle diameter of 15% or less, and the spacer particles consisting of a cross-linked acrylic ester resin that is a polymer of a monomer mixture containing an acrylic ester monofunctional monomer in an amount of 50 to 95% by mass and a cross-linkable monomer in an amount of 5 to 50% by mass.

2. The spacer particles for a resin composition layer according to claim 1,
  wherein the spacer particles have a rate of change in compressive strength at 10% compressive deformation by a temperature change from −20° C. to room temperature of 30% or less.

3. The spacer particles for a resin composition layer according to claim 1,
  wherein the acrylic ester monofunctional monomer is an acrylic ester of a $C_{1-8}$ alcohol.

4. A laminated sheet comprising:
  a sheet substrate; and
  a resin composition layer on the sheet substrate,
  the resin composition layer comprising the spacer particles for a resin composition layer according to claim 1.

5. Spacer particles for a resin composition layer, the spacer particles being used for being added into the resin composition layer for controlling a thickness of the resin composition layer,
  the spacer particles having a compressive strength at 10% compressive deformation at room temperature ranging from 0.05 to 2.06 MPa,
  the spacer particles having a rate of change in compressive strength at 10% compressive deformation by a temperature change from −20° C. to room temperature of 30% or less,
  the spacer particles having a volume average particle diameter ranging from 2 to 200 μm,
  the spacer particles having a coefficient of variation in particle diameter of 15% or less, and the spacer particles consisting of a cross-linked acrylic ester resin that is a polymer of a monomer mixture containing an acrylic ester monofunctional monomer in an amount of 50 to 95% by mass and a cross-linkable monomer in an amount of 5 to 50% by mass.

6. The spacer particles for a resin composition layer according to claim 5,
  wherein the acrylic ester monofunctional monomer is an acrylic ester of a $C_{1-8}$ alcohol.

7. A laminated sheet comprising:
  a sheet substrate; and
  a resin composition layer on the sheet substrate,
  the resin composition layer comprising the spacer particles for a resin composition layer according to claim 5.

8. Spacer particles for a resin composition layer, the spacer particles being used for being added into the resin composition layer for controlling a thickness of the resin composition layer,
  the spacer particles having a compressive strength at 10% compressive deformation at room temperature ranging from 0.05 to 2.06 MPa,
  the spacer particles having a compressive load at room temperature ranging from 0.01 to 2 N, the compressive load being determined at 10% compressive deformation in a thickness direction of the resin composition layer, when the spacer particles are added into the resin composition layer so that the resin composition layer contains 48% by mass of the spacer particles,
  the spacer particles having a rate of change in compressive load by a temperature change from −50° C. to 50° C. of 15% or less, the compressive load being determined at 10% compressive deformation in a thickness direction of the resin composition layer, when the spacer particles are added into the resin composition layer so that the resin composition layer contains 48% by mass of the spacer particles,
  the spacer particles having a volume average particle diameter ranging from 2 to 200 μm,
  the spacer particles having a coefficient of variation in particle diameter of 15% or less, and the spacer particles consisting of a cross-linked acrylic ester resin that is a polymer of a monomer mixture containing an acrylic ester monofunctional monomer in an amount of 50 to 95% by mass and a cross-linkable monomer in an amount of 5 to 50% by mass.

9. The spacer particles for a resin composition layer according to claim 8, wherein the acrylic ester monofunctional monomer is an acrylic ester of a $C_{1-8}$ alcohol.

10. A laminated sheet comprising:
a sheet substrate; and
a resin composition layer on the sheet substrate,
the resin composition layer comprising the spacer particles for a resin composition layer according to claim 8.

* * * * *